Nov. 8, 1932.  J. W. BRADY, JR  1,887,284
METHOD AND APPARATUS FOR PRODUCING AND MAINTAINING
ROTARY MOTION OF CONSTANT SPEED
Filed Jan. 26, 1931  3 Sheets-Sheet 1
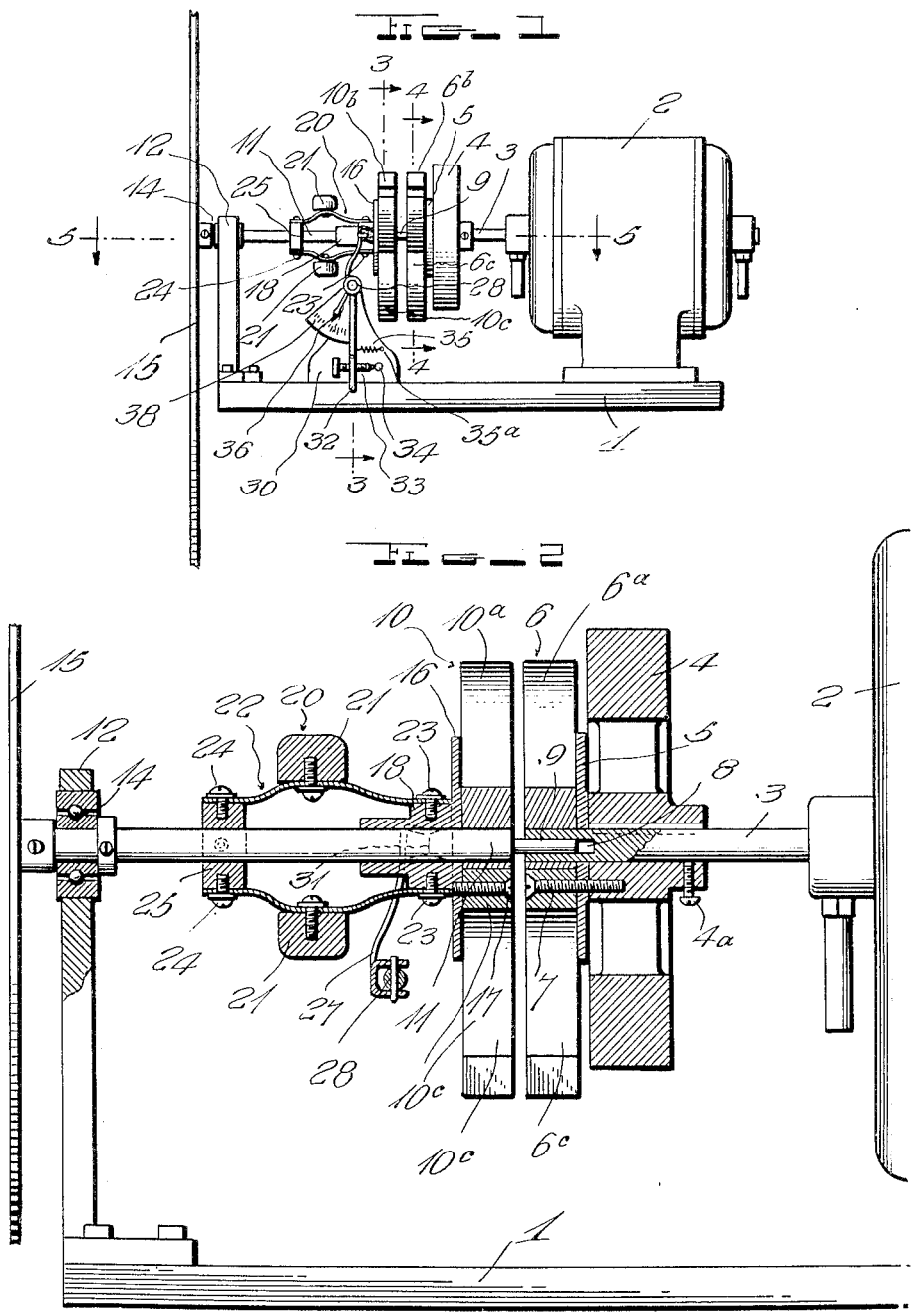
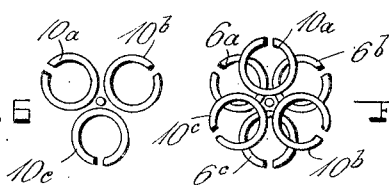

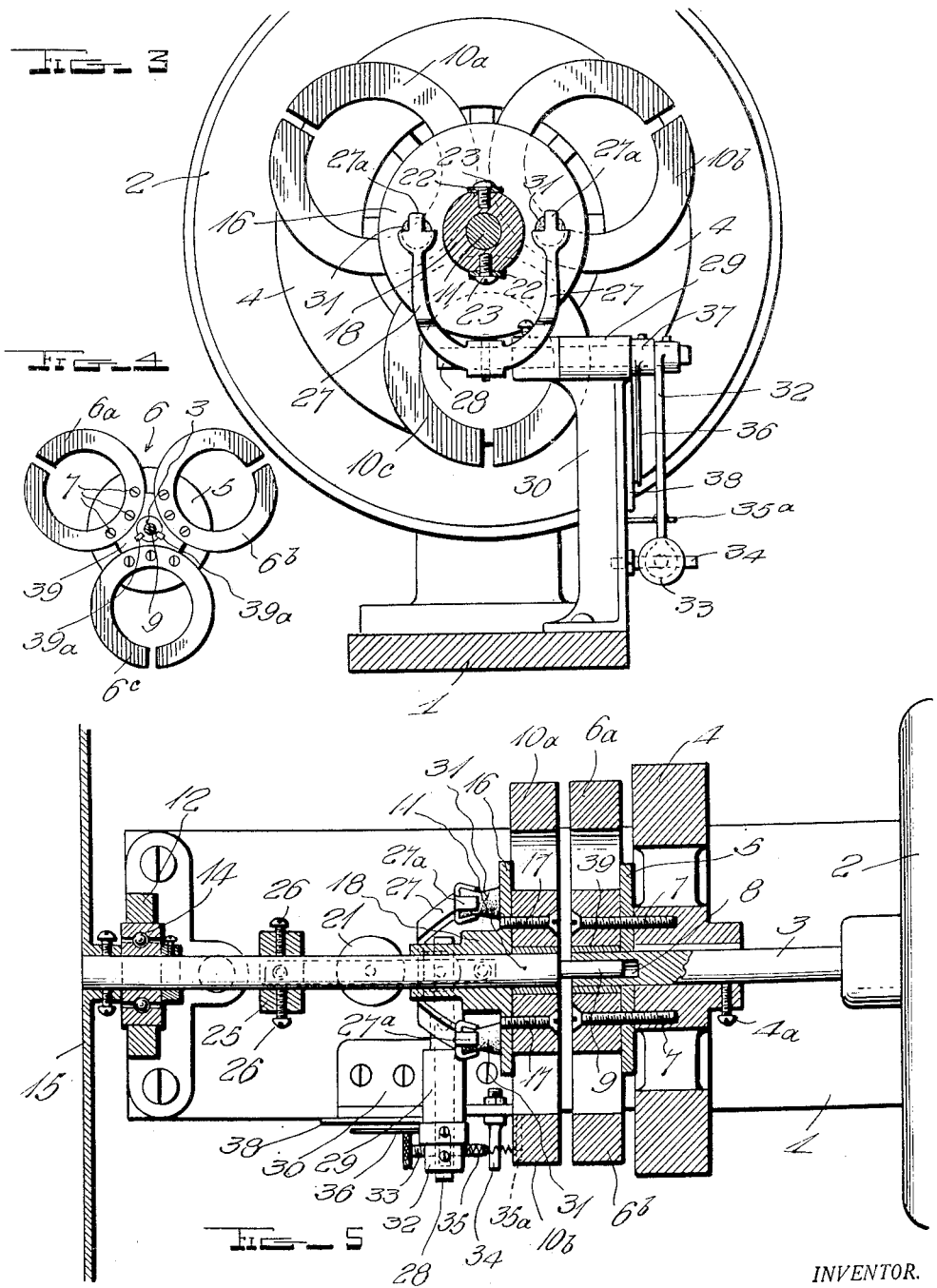

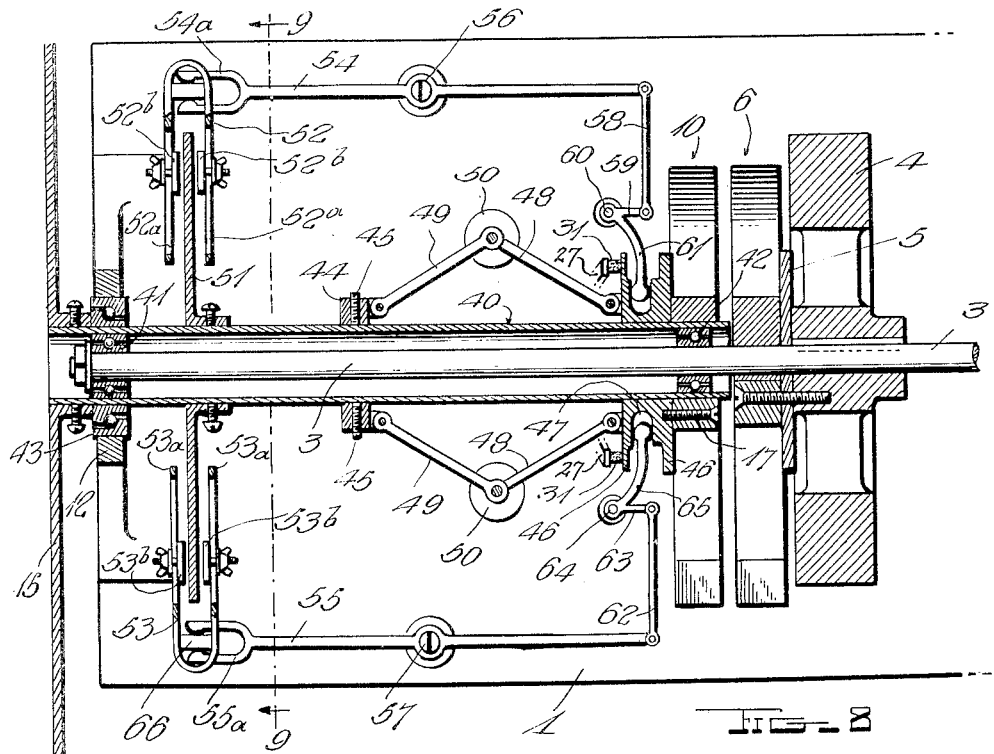
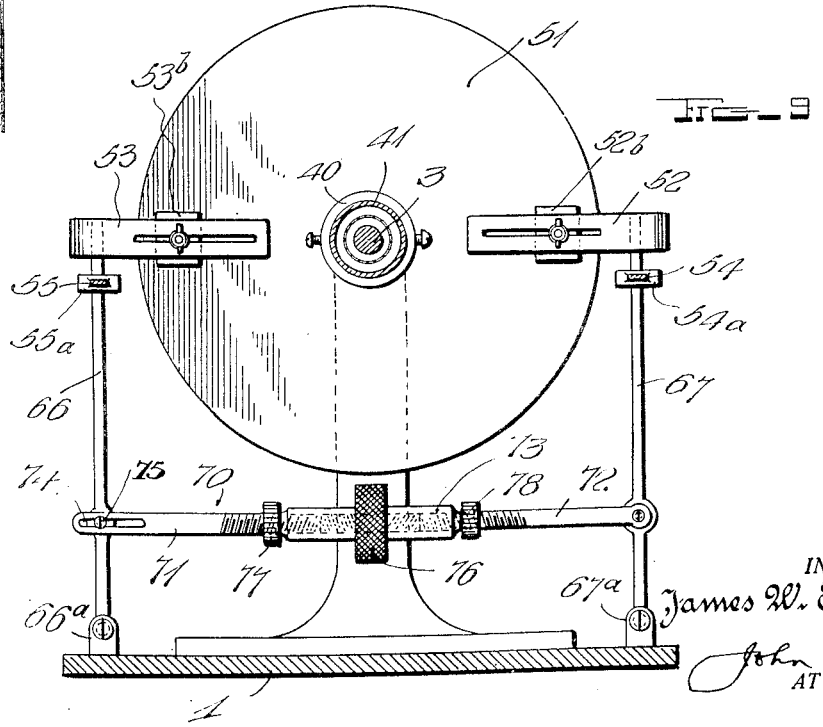

Patented Nov. 8, 1932

1,887,284

UNITED STATES PATENT OFFICE

JAMES W. BRADY, JR., OF BRUNSWICK, GEORGIA, ASSIGNOR OF ONE-THIRD TO MILLARD REESE, OF BRUNSWICK, GEORGIA

METHOD AND APPARATUS FOR PRODUCING AND MAINTAINING ROTARY MOTION OF CONSTANT SPEED

Application filed January 26, 1931. Serial No. 511,408.

My invention relates to a method and apparatus for securing constant speed from a variable power source.

One of the objects of my invention is to provide a method and apparatus adapted to drive any form of rotatable mechanism at a constant speed irrespective of variations in speed of the power source above a predetermined driving speed.

Another object of my invention is to provide a construction of speed regulating apparatus wherein rotative mechanism may be maintained at a constant speed irrespective of changes in speed above a predetermined speed which may occur in a driving source.

A further object of my invention is to provide a mechanical and magnetic coupling system for transmitting power from a power source to a load having means whereby the power delivered to the load may be maintained constant irrespective of variations in speed of the driving source above a minimum speed fixed at not less than the constant speed sought to be maintained.

Still another object of my invention is to provide a mechanism including a prime mover and a rotatable device with means interlinking the prime mover and the rotatable device for insuring rotation of the rotatable device at constant speed irrespective of fluctuations of the speed of the prime mover within predetermined limits not lower than the constant speed sought to be maintained by the rotatable device.

A further object of my invention is to provide a magnetically controlled speed responsive device for interlinking a prime mover with a rotatably driven device, the speed responsive device including a pair of magnetically coupled members adapted to slip one with respect to another for maintaining the rotatably driven device at constant speed irrespective of changes in speed of the prime mover within predetermined limits not lower than the constant speed to be maintained by the rotatably driven device.

A still further object of my invention is to provide an arrangement of magnetic coupling between a floating driven member and a driving source, the parts of the magnetic coupling having no physical connection and arranged to act mutually one with respect to another by magnetic force for imparting constant speed to a rotatable mechanism irrespective of changes in rotative speed of the driving source within predetermined limits not lower than the constant speed to be maintained by the rotatably driven device.

Other and further objects of my invention will be understood from the specification hereinafter following by reference to the accompanying drawings, wherein:

Figure 1 is a side elevation of one form of apparatus embodying the principles of my invention; Fig. 2 is a central vertical longitudinal section of a portion of the apparatus shown in Fig. 1 on an enlarged scale and showing the magnet systems in the position which they assume when the mechanism has developed a high rate of speed; Fig. 3 is a tranverse vertical sectional view on line 3—3 of Fig. 1 showing the magnetic systems in aligned positions; Fig. 4 is a front view of the driving magnetic system; Fig. 5 is a horizontal sectional view taken substantially on line 5—5 of Fig. 1; Fig. 6 is a diagrammatic view showing the driving and driven magnetic systems in aligned positions; Fig. 7 is a diagrammatic view showing the two magnetic systems displaced from each other during the process of slippage of the driven shaft with respect to the driving shaft where the driving shaft operates at a different rate of speed than the driven shaft; Fig. 8 is a horizontal sectional view of a modified form of apparatus embodying my invention; and Fig. 9 is a transverse sectional view taken on line 9—9 of Fig. 8.

My invention is directed to a system for imparting constant speed to a rotatable element from a prime mover irrespective of changes in speed of the prime mover within predetermined limits not less than the constant speed sought to be maintained by the rotatable device. I have obtained extremely constant speed conditions with the apparatus of my invention which renders the apparatus particularly effective wherever constant speed may be required. My invention is particularly suited for television systems where it is essential to maintain the speed of the television receiving apparatus in synchronism with the television transmitting apparatus. Usually in television systems a scanning disc is employed. The scanning disc at the transmitter operates to successively divide the object into sections, each of which are employed to effect different degrees of modulation of the transmitter. The apparatus of my invention is employed to drive the scanning disc at a selected and predetermined speed which may be depended upon to remain constant. At the receiving station, a similar apparatus is employed for driving the scanning disc which is interposed between the path of vision and the variable light source controlled by the television receiver. The apparatus of my invention drives the scanning disc at a constant speed which is set in exact synchronism with the speed of the scanning disc at the transmitter which is also driven at constant speed by a like device. The lack of properly synchronized scanning means has heretofore retarded the progress of the television art but with the apparatus of my invention the failure to obtain constant speed and synchronism is eliminated.

I also employ the constant speed mechanism of my invention as a governor for all classes of mechanical movements, engines, turbines, dynamos, generators, motion picture apparatus, telegraphic printers, stock tickers, and in other instances where a constant rotative movement is required.

The apparatus of my invention consists of a magnetically coupled system which is interposed between the prime mover and the rotatable device which is to be driven. The prime mover carries a fly wheel adapted to smooth out the fluctuations in power within given limits. Connected with the shaft carrying the fly wheel, I provide a magnetic system. I may employ an arragement of one or more electromagnets in the magnetic system, or one or more permanent magnets may be provided distributed in different angular positions about the driven shaft. Magnetically coupled to the magnetic system heretofore disclosed, I provide a similar magnetic system having no mechanical or physical connection to the first mentioned magnetic system. The second magnetic system is free to revolve independently of the first mentioned magnetic system and is connected with the shaft to which constant speed is to be imparted. The mass of the second magnetic system is selected so that predetermined inertia is introduced to maintain the second magnetic system in rotation at a predetermined constant speed. A mechanical governor is associated with the second mentioned magnetic system and a friction drag is arranged to be adjusted against an annular portion of the second mentioned magnetic system. The shaft connected with the second mentioned magnetic system extends to any desired form of rotatably driven device.

The two magnetic systems herein referred to are disposed on independent rotatable axes, that is one magnetic system is operated by the driving shaft extending from the prime mover and the other magnetic system is carried by the shaft to which constant speed is to be imparted. The mechanical governor is connected with the second mentioned magnetic system and is adapted to shift the position of the second mentioned magnetic system with respect to the first mentioned magnetic system by reason of the magnetic coupling between the magnetic systems consisting of either repulsion and attractive force, or both. The rotation of the first mentioned magnetic system imparts rotary movement to the second magnetic system due to the mutual action of the first magnetic system upon the second magnetic system. A predetermined spacial relation is maintained between the first mentioned magnetic system and the second mentioned magnetic system when the magnetic systems are in a condition of rest. However, after the first mentioned magnetic system reaches maximum speed, which is the normal speed of the prime mover, the successive repulsion and attractive forces existing between the magnetic systems tend to increase the speed of the second mentioned magnetic system which has a selected mass with inherent inertia, whereupon the mechanical governor under centrifugal action tends to shift the second mentioned magnetic system longitudinally along the driven shaft increasing the spacial relation between the magnetic systems thus decreasing the mutual magnetic effect one upon the other. That is, the several pole pieces carried by the first mentioned magnetic system operate upon the several pole pieces of the second mentioned magnetic system but with an effect which decreases as the spacial relation increases.

The frictional drag mechanism is brought into action by means of a thumb nut, screw, or other mechanical device which prevents the mechanical governor under centrifugal action from shifting the driven magnetic system further longitudinally along the driven shaft than is sufficient to maintain the predetermined constant speed of the driven shaft. By so adjusting the frictional drag mechanism as not to allow the centrifugal action of the mechanical governor to shift the driven magnetic system further away from the driving magnetic system, attached to the power source, than is necessary to maintain the desired constant speed of the driven magnetic system, any constant speed desired which is less than the speed of the driving magnetic system can be obtained and maintained. And this is by reason of the fact that the two magnetic systems are adapted to run at different speeds as one system, when the proper longitudinal distance between the two has been predetermined by an adjustment of the frictional drag mechanism, is capable of slipping with respect to the other magnetic system. In other words, there is a loose coupling between the driven shaft and the driving shaft. When the speed of the driving system increases the slip between the two systems is greater and the speed of the driven system does not increase with the increase in speed of the driving system because there is more slip, and conversely when the speed of the driving system decreases there is less slip and the speed of the driven system does not decrease with the decrease of speed of the driving system. This constant speed is brought about by a constantly varying amount of slip betwen the two systems exactly proportionate to the speed of rotation of the driving system provided the spacial relation between the two systems is preserved constant.

In order to secure constant speed operation of the driven shaft the inertia must first be built up by the first mentioned magnetic system operating upon the second mentioned magnetic system until the second mentioned magnetic system has been initiated into a condition of sustained rotation. The second mentioned magnetic system operates as a fly wheel by virtue of its mass to the extent of maintaining the driven shaft under a condition of continuous rotation by reason of the inertia of the parts of the second mentioned magnetic system. When the rotative movement of the second mentioned magnetic system has reached a given rate the second mentioned magnetic system is shifted sufficiently out of the field of the first mentioned magnetic system so that the first mentioned magnetic system is less effective upon the second mentioned magnetic system which is then under control of the friction drag and the inertia developed by the mass of the second mentioned system. The driven shaft then continues to operate at a constant speed.

Should fluctuations occur in the speed of the first mentioned magnetic system, such fluctuations will not have the same effect upon the second mentioned magnetic system as was obtained from the original driving force in that the second mentioned magnetic system has been shifted out of the field of the first mentioned magnetic system to a greater degree. However, successive impulses constituting a driving force are continuously applied to the second mentioned magnetic system and this driving force coupled with the inertia of the parts of the second mentioned magnetic system maintains constant speed on the driven shaft. The impulses which are supplied to the second mentioned magnetic system are integrated to produce the required turning torque and are applied even though the second mentioned magnetic system is shifted away from the immediate influence of the first mentioned magnetic system. The second mentioned magnetic system periodically receives increments of energy from the first mentioned magnetic system which keeps the second mentioned magnetic system spinning at the required speed. Should the speed of the first mentioned magnetic system drop even a large amount, so long as the speed of the first mentioned magnetic system is more than the constant speed chosen for the second mentioned magnetic system there is no effect upon the rotation of the second mentioned magnetic system and constant speed is maintained at the driven shaft.

In order to insure the constant speed characteristics of my invention, I so relate the constant speed of the driven shaft to the normal speed of the driving shaft that the normal speed of the driving shaft is always larger than or equal to the constant speed required at the driven shaft.

My invention has been devised, taking advantage of the fact that a prime mover such as electric motor will have relatively small variations in speed due to variations in line voltage or other causes. The magnetically coupled system will impart to the driven shaft a constant speed so long as the driving motor in its fluctuations does not fall below the desired constant speed to which the driven shaft has been adjusted.

From the foregoing it will be seen that the apparatus of my invention is particularly adapted for television where a load in the form of a scanning disc must be maintained at constant speed irrespective of variations in speed of the prime mover which may occur for various reasons.

In lieu of the mechanical friction drag which I employ, I may provide a magnetic drag adapted to be effective upon an inductor member carried by the driven shaft. I provide radially positioned magnetic devices which are shifted radially of the driven shaft according to the inertia of the second mentioned magnetic system. The change in position of the magnetic devices upon the inductor varies the moment arms over which the magnetic devices are effective with respect to the inductor and thereby introduce a retarding force in varying degrees upon the second mentioned magnetic system. The prime mover subjects the driving shaft to rotative movement at a rate of speed greater than the constant speed desired at the driven shaft. In this way a surplus driving force is available.

The loose coupled system obtainable by means of the magnetic coupling enables the driven shaft to selectively obtain the required driving torque to maintain the driven shaft at a uniform rate of speed regulated by the shifting of the magnetic devices with respect to the inductor carried by the driven shaft.

The highest constant speed to which the driven shaft can be adjusted is the lowest range of speed to which the driving shaft may fluctuate. The slippage which is obtainable between the first mentioned magnetic system and the second mentioned magnetic system makes it possible for the driving shaft to operate at a different rate of speed from the driven shaft and permits the driven shaft to be maintained under the influence of the magnetic speed regulating device and the inertia of the mass of the second mentioned magnetic system at constant speed.

Referring to the drawings in detail, reference character 1 designates a supporting structure in which the apparatus of my invention is mounted. The prime mover in the apparatus which I have utilized for purposes of illustrating my invention is designated at 2 having a driving shaft 3 extending thereupon. The driving shaft 3 carries a fly wheel 4 secured thereon by means of a suitable key way and set screw 4a. A plate member 5 is disposed immediately adjacent one side of the fly wheel 4 and serves as a spacing member for the magnetic system 6. The magnetic system 6 is secured by means of screws 7 to the fly wheel 4, being spaced therefrom by means of the plate member 5. The driving shaft 3 is recessed at the end thereof at 8 as shown and receives the projecting end 9 of the driven shaft 11, the projecting end 9 fitting concentrically within the recess 8 in the end of shaft 3. The end of the driven shaft 11 is journalled at 14 in the bearing support 12 carried by the supporting base 1. Shaft 11 actuates any desired rotary mechanism which must be driven at constant speed such as the scanning disc 15. The shaft 11 is provided with a slidably mounted magnetic system 10 therein which is aligned with the magnetic system 6 which is fixedly secured to the driving shaft 3. There is no positive driving connection between the driving shaft 3 and the stub shaft 9 which projects from the end of the driven shaft 11. A plate member 16 is secured to the driven magnetic system 10 by means of screws 17. The plate member 16 is integrally connected with a sleeve 18 which is slidably mounted with respect to the driven shaft 11. The centrifugal device which effects sliding movement of the magnetic system 10 is shown at 20 comprising weights 21 secured to springs 22 which are attached at one end to the slidably mounted sleeve 18 by means of screws 23 and are secured by means of screws 24 at the opposite end to the collar 25 fixedly mounted on the shaft 11 which is fixed in position on the shaft 11 by means of set screws 26. As will be seen in Fig. 2 the magnetic system 10 revolves in spacial relation to the magnetic system 6 and as the speed of the magnetic system 10 increases and the centrifugal effect of the weights 21 of the centrifugal governor 20 increases, the spacial relation of the magnetic system 10 with respect to the magnetic system 6 increases. In order to limit the increase in spacial relation of the magnetic system 10 with respect to the magnetic system 6, I provide an adjustable stop which is variably related to the annular plate 16. The adjustable stop comprises a yoke member 27 which is carried by laterally disposed shaft 28. The shaft 28 is journalled in the bearing member 29 supported from the base 1 by means of vertical support 30. The yoke 27 has two arms which terminate on diametrically opposite sides of the slidably mounted sleeve 18. The arms of the yoke 27 each terminate in a plurality of fingers 27a which enclose friction pad members 31 bearing against the circular plate 16. The end of the shaft 28 which projects through the bearing 29 is provided with a lever arm 32 having an adjustable micrometer screw 33 therein adapted to bear against stop 34 carried on the vertically projecting support 30. By turning the micrometer screw 33 the position of the lever arm 32 may be changed to displace the yoke 27 and change the position of the friction pads 31 with respect to the circular plate 16. The spring 35 connected to pin 35a on standard 30 at one end and to the lever 32 at the other end, tends to urge the yoke 27 away from the circular plate 16 while adjustment of micrometer screw 33 moves the yoke 27 toward the circular plate 16 against the action of the spring 35. An indicator arm 36 is secured to the shaft 28 by means of a collar 37 and moves over a scale 38. By means of the calibrations on the scale, the indicator 36 may be set or reset to desired positions for fixing the spacial relation of the magnetic system 10 with respect to the magnetic system 6.

The magnetic systems 6 and 10 comprising a multiplicity of permanent magnetic members having relatively large parallel surfaces as shown more clearly in Figs. 3, 4, 6 and 7. In the embodiments of my invention herein illustrated the magnetic systems have permanent pole pieces although it will be understood that electromagnetic poles may be employed.

In Fig. 3 the permanent pole pieces are shown at 10a, 10b and 10c each constituting a horseshoe magnet having opposite poles separated by magnetic leakage gaps. In Fig. 4 the driving magnetic system is shown including permanent magnets 6a, 6b and 6c secured as hereinbefore described by means of screws 7 through plate 5 to the fly wheel 4. In order to secure the permanent magnets 6a, 6b and 6c in position I provide a nonmagnetic insert 39 between the permanent magnet 6a, 6b and 6c as shown. The member 39 is locked in position between the permanent magnets 6a, 6b and 6c and is keyed by means of key members 39a to the driving shaft 3 into which the driven spindle 9 telescopically fits.

In Fig. 6, I have shown the poles of the permanent magnet systems in register with each other. That is, poles 10a, 10b and 10c are aligned with respect to poles 6a, 6b and 6c. This is the condition which will prevail when the drive shaft initiates the driven shaft into movement and acquires a velocity necessary to synchronize the movement of the driven shaft with the movement of the driving shaft.

In Fig. 7, I have shown the condition which exists when rotative slippage occurs between the driving shaft and driven shaft and where the permanent poles are angularly displaced with respect to each other, the permanent poles 10a lying intermediate the permanent poles 6a and 6b at a selected instant during the period of rotative movement.

As the prime mover 2 picks up in speed driving shaft 3 rotates the permanent magnet system 6. The poles 6a, 6b and 6c exert repulsion and attraction forces with respect to poles 10a, 10b and 10c of the permanent magnet system 10 and establish rotative movement of shaft 11. The centrifugal system 20 thereafter becomes effective to draw the magnet system 10 away from the magnet system 6. The amount of such withdrawal is limited by the movement of the yoke 27 under control of shaft 28 and the bearing of the pads 31 against the circular plate 16. As the gap increases between the magnetic system 6 and the magnetic system 10 less influence exists between the magnetic systems and the rotary shaft 11 is therefore free to operate at a constant speed regulated by the inertia between parts of the rotative system including the magnetic system 10. The magnetic system 6 continues to exert driving influence upon the magnetic system 10 but is free to slip with respect to the magnetic system 10 so that variations in speed of the prime mover 2 above a predetermined limit do not affect the rotative movement of the driven shaft 11. A relatively light load is operated by rotary shaft 11 such as the scanning disc 15 which must be maintained at constant operating speed.

In Figs. 8 and 9, I have shown a modified form of my invention wherein the driven magnetic system 10 is mounted adjacent the driving magnetic system 6 and is free to slide longitudinally along the tubular shaft 40. In this arrangement the drive shaft 3 projects through the tubular shaft 40 and is provided with antifriction bearings 41 and 42 which serve to support the tubular shaft 40 for rotative movement around the central shaft 3. The load to which constant rotative movement is to be imparted is shown in the form of a scanning disc secured to the end of the rotatable tube 40 as shown. The support 12 carrying the anti-friction journal 43 provides a mounting for the end of the tubular shaft 40. A collar 44 is secured to the tubular shaft 40 by means of set screws 45. A sleeve member 46 having an annular groove 47 therein is mounted for slidable movement over the tubular shaft 40 and is connected to the magnetic system 10 by screws 17. The sleeve 46 is connected by pivotally connected links 48 to similar pivotally connected links 49 which connect with the fixed collar 44 and have weights 50 thereon. The centrifugal force produced by the radially outward movement of weights 50 operates to shift the magnetic system 10 away from the field of the magnetic system 6. In order to control the speed of the tubular rotatable shaft 40, I provide a magnetic disc 51 in fixed position on tubular shaft 40 on opposite sides of which a pair of magnetic systems are radially adjustable. One magnetic system is shown at 52 having pole pieces 52a on which the shoes 52b are adjustably secured. The magnetic system 52 is radially adjustable with respect to the magnetized disc 51. Another magnetic system is shown at 53 having pole pieces 53a extending on opposite sides of the disc 51 with adjustable pole shoes 53b on the poles 53a. The magnetic system 53 is adjustable radially with respect to the disc 51. The mechanism for effecting the radial movement of the magnetic systems 52 and 53 consists of a pair of levers represented at 54 and 55 which are pivoted at 56 and 57, respectively, and connected through links with a lever member which projects into the annular groove 47 in the slidably mounted sleeve 46. The lever 54 pivoted at 56 is connected to link 58 which in turn connects to the bell crank 59 which is pivoted at 60 and has a portion 61 projecting into the annular groove 47 in the slidable sleeve 46. Lever 55 which is pivoted at 57 connects through link 62 to bell crank 63 which is pivoted at 64 and has a portion 65 projecting into the annular groove 47 in sleeve 46. The levers 54 and 55 terminate in yokes 54a and 55a which slidably embrace the bridge portions 52c and 53c of the permanent magnet systems 52 and 53. The shiftable mounting means 66 and 67 which are disposed in universally movable mounts 66a and 67a allow the magnetic systems 54 and 53 to be moved radially or substantially radially with respect to the magnetic disc 51. The movement of sleeve 46 longitudinally of the shaft imparts movement to the levers 54 and 55 through the bell cranks and intermediate links, thereby shifting the magnetic systems 52 and 53 radially of the magnetized disc 51 and applying a retarding force to the tubular rotatable shaft 40. This retarding force is brought about by the application of opposing localized fields on the magnetized disc 51 at different radial distances from the rotatable shaft 40. That is, in overspeed conditions, the poles 52b of the magnet system 52 and the poles 53b of the magnet system 53 will be shifted nearer the peripheral edge of the disc 51 and thereby exert a larger retarding force on the rotatable shaft 40 by reason of the larger moment arm obtainable by the distance of the localized retarding magnetic effect from the axis of the disc 51. As the speed acquires the constant speed condition desired for continuous operation, the sets of pole pieces 52b and 53b are maintained in a predetermined position with respect to the axis of the disc 51. In order to limit the spacial relation of the magnetic system 10 with respect to the magnetic system 6, I introduce a yoke device around the tubular rotatable shaft 40 having friction pads 31 therein similar to the arrangement illustrated in Figs. 1, 3 and 5. The friction pads 31 bear upon one face of the slidable sleeve 46 and limit the longitudinal movement of the magnetic system 10 with respect to the driving magnetic system 6. The same form of adjusting mechanism is employed as that heretofore described in Figs. 1, 3 and 5, so that by suitable calibration, the particular speed at which the tubular rotatable shaft 40 is to be driven may be selected and thereafter fixed.

In order to limit the speed at which the driven shaft 40 is controlled, I provide a manual adjusting device indicated at 70 extending between the shiftable mounting means 66 and 67 as shown. The limiting means comprises a pair of links 71 and 72 having screw threaded ends engaged by the rotatable sleeve member 73. The screw threads on the links 71 and 72 extend in opposite directions and rotation of sleeve member 73 clockwise or counterclockwise operates to change the maximum separation of the mounting means 66 and 67. The link 71 is slotted as at 74 for engaging the pin 75 in the shiftable mounting means 66. The links 72 and 71 can be therefore lengthened or shortened by revolving the thumb screw 76 and then tightening the lock nuts 77 and 78. The distance to which the centrifugal weights 50 may therefore displace the pole shoes 52b and 53b outwardly toward the periphery of the magnetized disc 51 is therefore limited by the extent to which the links 71 and 72 will permit the pole shoes to be radially shifted. The slot 74 insures the unrestricted movement of the sets of pole shoes 52b and 53b within given limits but prevents the movement of these pole shoes beyond a predetermined limit, thereby preventing the magnets from being moved further out from the center of the eddy current disc 51 than is necessary to maintain the desired spacial relation between the driving and driven magnetic systems.

I have found the mechanism of my invention to be accurate in the establishment and maintenance of constant rotative speed. The apparatus of my invention is extremely simple in its construction and practical for application in any machines requiring constant rotative speed.

While I have described my invention in certain of its preferred embodiments, I desire that it be understood that modifications may be made and that no limitations upon my invention are intended other than are imposed by the scope of the appended claims.

What I claim as new and desire to secure by Letters Patent of the United States is as follows:

1. A system for operating rotatable mechanism at constant speed comprising a freely rotatable driven shaft, a positively operated driving shaft, a multiple pole magnet carried by each of said shafts in juxtaposed positions, a centrifugally operated device connected with the multiple pole magnet on said freely rotatable driven shaft and adapted to automatically change the spacial relation of said multiple pole magnets for withdrawing the magnet on said freely rotatable driven shaft out of the immediate field of the magnet on said driving shaft, a bearing surface formed on the rear of the magnet on said driven shaft and adjustable means for frictionally engaging the bearing surface on said last mentioned magnet for governing the rotation of said driven shaft at constant speed.

2. A system for operating rotatable mechanism at constant speed comprising a freely rotatable driven shaft, a positively operated driving shaft, a multiple pole magnet carried by each of said shafts each of said magnets having pole pieces adapted to be aligned one with the other in juxtaposed positions, a centrifugally operated device connected with the multiple pole magnet on said freely rotatable driven shaft and adapted to change the spacial relation of said multiple pole magnets for withdrawing the magnet on said freely rotatable driven shaft out of the immediate field of the magnet on said driving shaft for sustaining rotation of said driven shaft at constant speed, a plate member carried by one of said magnets and means for applying a selected amount of friction against said plate member and predetermining the maximum limit of the magnetic gap to which said multiple pole magnets are separated during running operation.

3. A system for operating rotatable mechanism at constant speed comprising a freely rotatable driven shaft, a positively operated driving shaft, a multiple pole magnet carried by each of said shafts in juxtaposed positions, a centrifugally operated device connected with the multiple pole magnet on said freely rotatable driven shaft and adapted to change the spacial relation of said multiple pole magnets for withdrawing the magnet on said freely rotatable driven shaft out of the immediate field of the magnet on said driving shaft for sustaining rotation of said driven shaft at constant speed, and a friction device adjustable against an annular portion of the multiple pole magnet on said freely rotatable driven shaft for controlling the rotation of said driven shaft and limiting the separation of the multiple pole magnets on said driving and driven shafts.

4. A system for operating rotatable mechanism at constant speed comprising a freely rotatable driven shaft, a positively operated driving shaft, a multiple pole magnet carried by each of said shafts in juxtaposed positions, a centrifugally operated device connected with the multiple pole magnet on said freely rotatable driven shaft and adapted to change the spacial relation of said multiple pole magnets for withdrawing the magnet on said freely rotatable driven shaft out of the immediate field of the magnet on said driving shaft for sustaining rotation of said driven shaft at constant speed, and a yoke member embracing said driven shaft and having means engaging one side of an annular portion of the multiple pole magnet on said driven shaft for limiting the separation of said multiple pole magnets.

5. A system for operating rotatable mechanism at constant speed comprising a freely rotatable driven shaft, a positively operated driving shaft, a multiple pole magnet carried by each of said shafts in juxtaposed positions, a centrifugally operated device connected with the multiple pole magnet on said freely rotatable driven shaft and adapted to change the spacial relation of said multiple pole magnets for withdrawing the magnet on said freely rotatable driven shaft out of the immediate field of the magnet on said driving shaft for sustaining rotation of said driven shaft at constant speed, an angularly adjustable yoke embracing said driven shaft and having friction shoes on the ends thereof engageable with an annular portion of the multiple pole magnet on said driven shaft, and means external to said shafts for effecting a micrometer adjustment of said yoke.

In testimony whereof I affix my signature.

JAMES W. BRADY, Jr.